United States Patent [19]

Gunzler

[11] 4,226,502
[45] Oct. 7, 1980

[54] SELF-CONTAINED SOLAR TRACKING DEVICE

[76] Inventor: Thomas Gunzler, 16149 Sherman Way, Van Nuys, Calif. 91406

[21] Appl. No.: 927,349

[22] Filed: Jul. 24, 1978

[51] Int. Cl.² ............................................. F24J 3/02
[52] U.S. Cl. ...................................... 350/83; 126/425
[58] Field of Search .............. 350/83; 353/3; 126/270, 126/271, 425

[56] References Cited

U.S. PATENT DOCUMENTS

| 3,982,526 | 9/1976 | Barak | 350/83 |
| 4,022,185 | 5/1977 | Von Hartitzsch | 126/425 |
| 4,027,651 | 6/1977 | Robbins | 126/425 |
| 4,044,752 | 8/1977 | Barak | 126/270 |
| 4,108,154 | 8/1978 | Nelson | 126/425 |
| 4,158,356 | 6/1979 | Wininger | 126/425 |

FOREIGN PATENT DOCUMENTS

| 982906 | 6/1951 | France | 353/3 |
| 1192769 | 10/1959 | France | 353/3 |

OTHER PUBLICATIONS

Farber, E. A. et al., *Jour. of Environmental Sciences*, vol. 18, No. 3, pp. 11-12, May-Jun. 1975, pp. 11-12.

*Primary Examiner*—Jon W. Henry
*Attorney, Agent, or Firm*—Robert Louis Finkel

[57] ABSTRACT

A trough type solar collector or other body is mounted to rotate about a generally north-south pivotal axis. A balance weight is supported on an elongated heat sensitive beam anchored at its ends to the westerly side of the collector. The beam is adapted to bow away from the collector when it is heated by the sun's rays, thereby causing the balance weight to exert westward rotational force on the collector. A reflector may be positioned behind the beam to concentrate the sun's rays on the beam. A shutter is fixed to the collector to shade the beam when the collector is pointing toward the sun. Biasing means, such as a fixed weight secured to the easterly side of the collector, oppose the torque exerted by the balance weight and urge the collector to rotate eastwardly when the beam is unbowed. Damping means control the speed of westward and eastward rotation of the collector, and a pair of stops limit its westward and eastward travel. Alternative forms of heat sensitive support means for the balance weight and biasing means are shown and described. The motion of the solar tracking body can be utilized to control the orientation of other structures, such as adjustable louvres, with respect to the diurnal motion of the sun.

29 Claims, 19 Drawing Figures

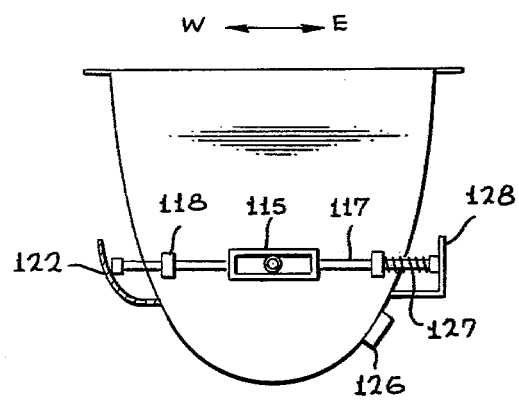
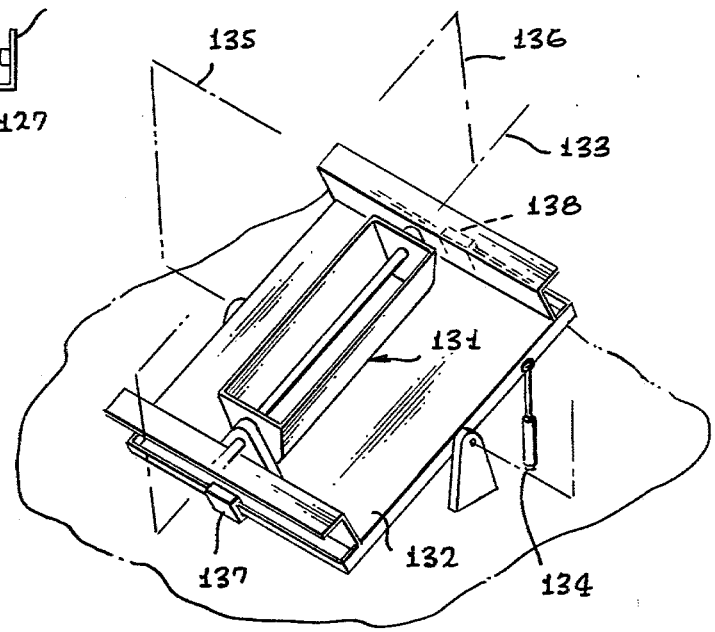
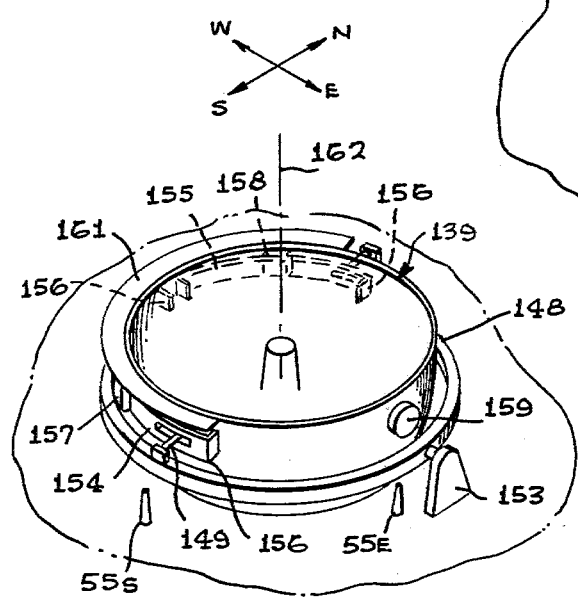
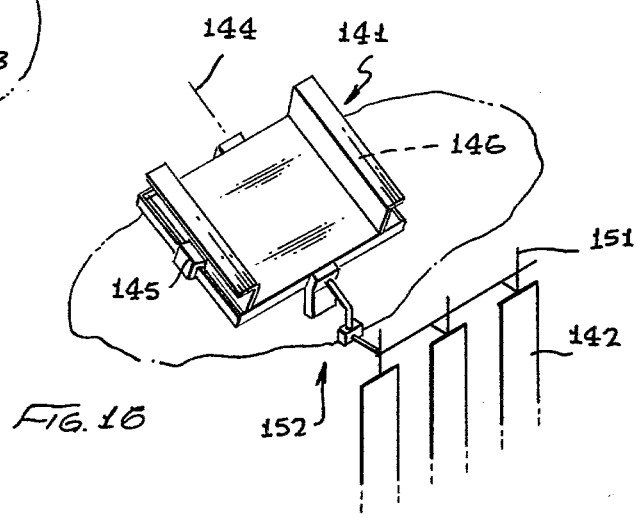

SELF-CONTAINED SOLAR TRACKING DEVICE

BACKGROUND OF THE INVENTION

1. Field of the Invention

This invention relates to mechanisms which automatically track the sun in its apparent westward motion across the sky between sunrise and sunset. More particularly it relates to self-contained solar energy-powered tracking means for driving devices such as solar collectors, reflectors, shutters and the like in response to the sun's diurnal movement.

2. Prior Art

Man's fascination with the sun has been traced to the dawn of history and has lead to some notable achievements, particularly during the past 50 years, in the development of devices for collecting and utilizing energy from this seemingly limitless source. Gradual but accelerating recognition, especially during the last decade, of the finite limit to the world's supply of fossil fuels and the lack of presently available alternative sources of energy has cast a sense of urgency over the need to put these devices into immediate widespread use.

Relatively efficient solar furnaces, heaters, energy convertors and the like have been designed and tested, and many are in actual use, but their mass application awaits the solution of a well known but heretofore never satisfactorily resolved problem. To utilize solar radiation effectively, it must either be concentrated by means of a convex or parabolic mirror or with some system of lenses, or allowed to impinge directly on the area to be heated or irradiated. Regardless of the type of system that is used, it has been demonstrated that for satisfactory results the collector must be mounted and driven to follow the sun's motion. The key to the efficient operation of any solar collector lies in maintaining the collector's reflective surface perpendicular to the incident radiation as long as possible during the diurnal transit.

In recognition of this fact the prior art contains a variety of solar tracking devices. In one of the earliest of these a weighted rope wound around the collector's axle is allowed to unwind at a controlled rate such that the angular rotation of the axle approximates that of the sun across the sky. Over the intervening centuries far more sophisticated clockwork mechanisms have been developed to accomplish the same purpose. The advent of the synchronous motor and servo-technology led to the development of tracking systems utilizing shaded bimetallic thermoregulators, silicon photocells and fluid-mechanical switches to actuate a tracking motor. Another class of tracking devices employs bimetallic springs or levers to power a variety of mechanical driving means. Still another class uses some form of piston operated fluid-mechanical drive.

While many of these devices are useful and some, in fact, are extremely accurate, by and large their advantages are more than offset by several disadvantages. The purpose of the subject invention is to provide a fully self-contained and entirely automatic solar tracking device which overcomes all of those disadvantages. More particularly, an object of the invention is to provide a tracking device which can be produced and operated inexpensively and which requires little maintenance and can be maintained easily. Another object is to provide a device of this general type capable of tracking the sun with a reasonable degree of precision throughout the entire diurnal transit and which automatically recycles itself at the end of that transit in readiness for the following diurnal cycle. Yet another object is to provide a solar tracking mechanism which responds well to changes in incident radiation.

Up to this point the discussion has been directed toward tracking devices for use on solar energy collectors. It will be understood that many of the considerations applicable to devices used to collect the sun's energy are equally applicable to devices used to interdict solar radiation. By way of example, in architecture the use of slats or louvres to control the incidence of solar radiation on the windows and walls of buildings is well known. The advantages of a device which would allow such slats or louvres to track the sun automatically are likewise well known. By and large the criteria for such a device are the same as those for a solar tracking mechanism used to control a solar energy collector. Accordingly, it is still another object of the invention to provide a solar tracking mechanism of the type previously discussed, which can be utilized in a variety of applications including solar energy collection and solar radiation interdiction.

For most applications, a tracking device responsive to the sun's diurnal motion across the sky is quite adequate. For others, however, compensation must be made for the annual movement of the sun in the ecliptic, or apparent yearly path in the sky northward and southward through the celestial equator. With such latter applications in mind, it is another object of the subject invention to provide a tracking device capable of automatically compensating for the constantly changing zenith distance or "high point" of the sun from day to day.

BRIEF SUMMARY OF THE INVENTION

To accomplish these and other objects which will become apparent, the structure to be controlled, for example a solar energy collector, is suspended for rotation about one or more orthogonally oriented axes passing substantially through its center of gravity. Since the construction and operation of the drive means associated with each of the axes are similar, for convenience a typical solar energy collector in the form of an elongated trough of roughly parabolic transverse section and having a single pivotal axis will be described here. The collector is effectively mounted to the earth with its pivotal axis oriented in a north-south line. To minimize the effect of the previously mentioned annual movement of the sun in the ecliptic, the pivotal axis may be aligned parallel to the axis of the earth. In more sophisticated embodiments of the invention this annual movement may be compensated by mounting the collector to a second pivotal axis oriented along an east-west line.

In the simplified embodiment, a balance weight is supported on an elongated heat sensitive beam anchored at its ends to the westerly side of the collector. A second weight is secured to the easterly side of the collector to provide an unbalanced torque biasing the collector to rotate about the pivotal axis toward the east. A shutter is fixed to the collector to shield the beam from the sun when the parabolic axis of the collector is aligned with the sun.

As the sun moves westwardly in the sky, the beam is exposed to its rays and, bowing outwardly, moves the balance weight away from the pivotal axis, thus creating an unbalanced torque causing the collector to rotate about the axis toward the west, thereby bringing the beam into the shadow cast by the shutter. Cooling, the beam un-bows and returns the balance weight to its original position, thereby re-establishing the unbalanced eastwardly directed torque and stopping the westward rotation of the collector. Differential damping means are provided for controlling the angular rate of rotation of the collector about the pivotal axis. Preferably, the collector is permitted to rotate somewhat more rapidly to the west than to the east.

Ideally, this mechanism should cause the collector to track the sun's diurnal motion with precision. In practice, however, the collector actually moves in a series of small correcting steps which closely approximate the motion of the solar disc.

To avoid disabling the system by having the weights establish themselves in a vertical plane, mechanical stops are provided which restrict the westward and eastward travel of the collector to within 10°-20° of the horizontal plane passing through the pivotal axis. At the end of the tracking cycle the collector comes to rest against the westerly stop. When the sun sets, the beam returns to its rest position and the eastwardly directed unbalanced torque created by the fixed weight rotates the collector until it comes to rest against the easterly stop in readiness for the next day's tracking cycle.

DESCRIPTION OF THE DRAWINGS

A better understanding of the invention will be afforded by the following detailed description of several of its preferred embodiments taken in conjunction with the accompanying drawings in which:

FIG. 13 is a diagramatic end view of a variation of the embodiment of FIGS. 12a and 12b;

FIG. 14 is a top perspective view of a solar heater mounted to a gimbal platform illustrating a more elaborate embodiment of the invention;

FIG. 15 is a top perspective view of a gimbal-mounted solar collector illustrating another embodiment of the invention; and FIG. 16 is a fragmentary diagramatic top perspective view of a louvre-controlling device embodying the subject invention.

DETAILED DESCRIPTION OF THE INVENTION

Figure 1:
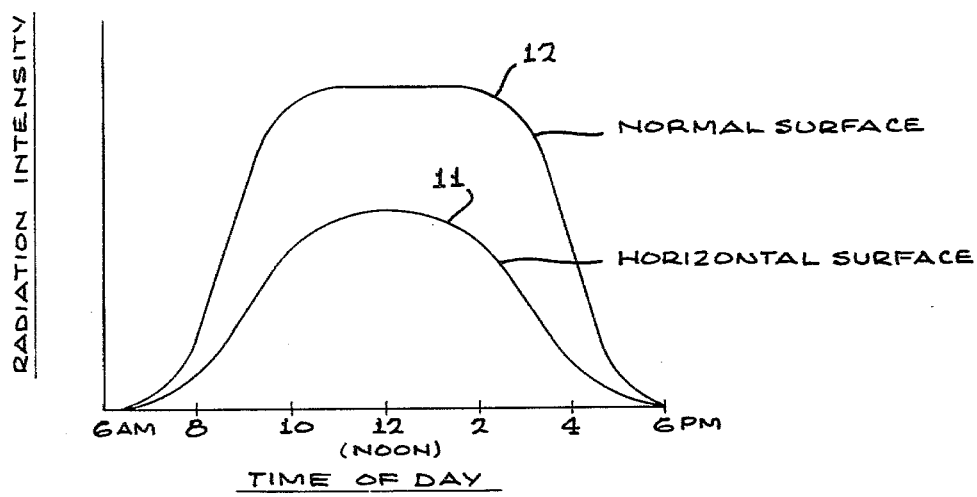
FIG. 1 is a graph showing in the incident solar radiation on a typical October day at Madison, Wisconsin.

The directional nature of incident solar radiation and the consequent need to move the energy collecting surface if substantial amounts of solar energy are to be captured are effectively illustrated in FIG. 1. The line 11 represents intensity of radiation measured on a horizontal collecting surface at Madison, Wis., on a particular day in October. The line 12 represents the radiation intensity measured at the same site on the same day incident to an identical surface which was maintained normal to the sun throughout the same period. The integrated energy flux under the two graphs amounted to 300 Langleys for the fixed collector, and 680 Langleys for the moveable one. Clearly, both the amount and intensity of available radiation are substantially higher with a moveable collector which is always normal to the sun's rays.

Figure 2:
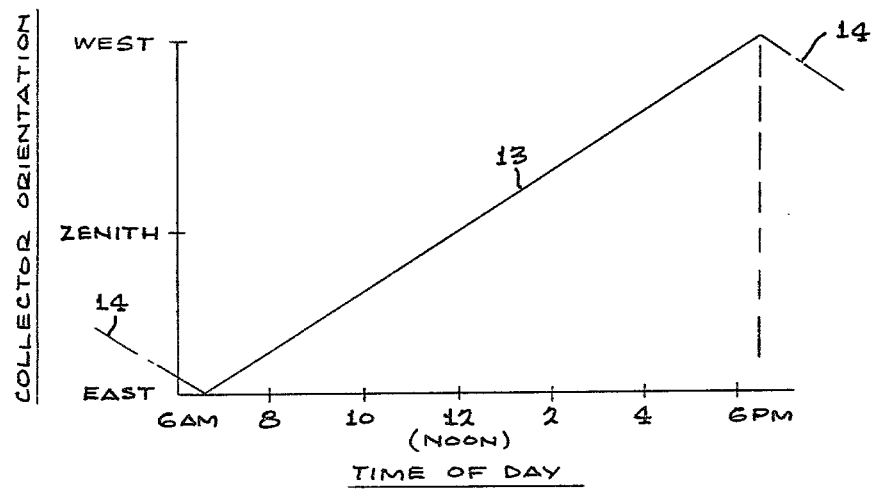
FIG. 2 is a graphic representation of the diurnal angular orientation path of the solar tracking device employed in making the measurements depicted in FIG. 1.

In FIG. 2, the line 13 graphically represents the angular orientation path followed by the moveable collector employed in the experiment depicted in FIG. 1 in tracking the disc of the sun across the sky between sunrise and sunset. Ideally, to maximize the quantity and source temperature of available solar radiation, the solar collector should be made to follow the path 13 of FIG. 2. To be of practical value, in addition to guiding the collector along the path 13 during the diurnal cycle, the tracking mechanism must also return the collector to its initial position between sunset and the following sunrise along a path corresponding to the line 14 or its functional equivalent.

Figure 3:
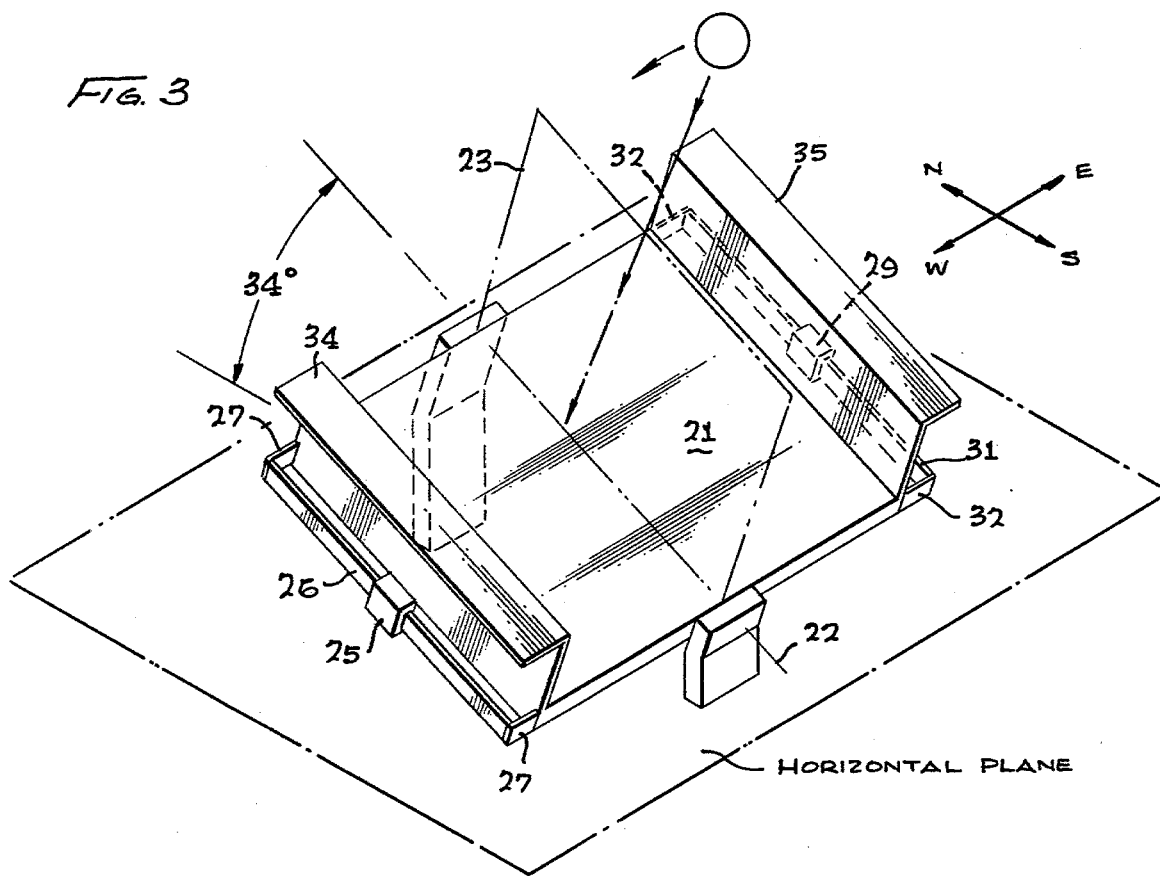
FIG. 3 is a diagramatic top perspective view of a solar tracking device embodying the subject invention.

For a clear understanding of the manner in which the tracking mechanism of the subject invention achieves these objects, a brief discussion of the principles on which it is based may be helpful. FIG. 3 illustrates diagramatically a hypothetical example of a typical moveable solar collector, in this instance a flat plate 21 pivotally mounted to rotate about an axis 22. Commonly, such a collector might contain a system of convoluted water tubes or an array of solar cells, or the like (not shown). As mentioned earlier, the collector's axis of rotation 22 is oriented in a north-south direction with respect to the earth's axis of rotation. Preferably it is inclined to parallel the earth's axis of rotation as well, in order to compensate for the sun's apparent celestial elevation at the local latitude. By way of example, in Los Angeles, Calif., the axis of rotation 22 is inclined at an angle of about 34° with respect to the local horizontal plane.

For any given heliostatic apparatus, depending on its configuration and function there is at least one angular relationship between its components and the solar disc in its apparent instantaneous position in the sky, which may be deemed optimum with respect to the device's intended use. In the case of a flat plate collector, such as collector 21, the optimum orientation of the line of sight to the sun is normal to the plate's surface. That is, for maximum efficiency and utilization of the available solar radiation, the plate 21 must be maintained normal to the incoming light rays. In the case of a spherical or parabolic dish collector, maximum efficiency requires that the central axis of the dish, that is, the axis of rotation of the circle or parabola of rotation conforming to the curve of the dish, coincide with the line of sight to the sun.

For descriptive purposes, this angular relationship will be represented by an imaginary reference or tracking plane passing through the primary pivotal axis of the body tracking the sun. As illustrated in FIG. 3, tracking plane 23, containing pivotal axis 22, is normal to the collector plate 21. It will be appreciated that since tracking plane 23 has the same north-south orientation as primary pivotal axis 22, the optimum line of sight will remain in plane 23 throughout the year, even while the path followed by the sun, shown substantially overhead in FIG. 3, descends in the sky toward the lower (southerly) end of collector 21 during the ecliptic.

A weight or balance mass 25 is mounted at the center of an elongated heat-sensitive buckling beam 26 supported by its ends between two sturdy mounts 27 extending rigidly from the westerly edge of collector 21. The mounts 27 may be of any suitable material and form, so long as they are not influenced by temperature, exposure to the elements or extended use, to vary the distance between them substantially.

The beam 26 is of any suitable metal alloy or other material capable of supporting mass 25 and having a high coefficient of thermal expansion. Preferably it is preformed with a slight curvature away from collector 26 or made somewhat longer than the distance between mounts 27 and bowed away from collector 21 when first mounted to them. The purpose of this is to predispose the beam to bend or bow toward the West when it lengthens upon exposure to direct sunlight. Other suitable means may of course be employed to accomplish this result.

Such thermally-induced bending or bowing moves balance mass 25 away from collector 21 and radially outwardly of pivotal axis 22, thereby increasing the torque exerted by mass 25, urging collector 21 to rotate toward the West.

It will be seen that by this arrangement balance mass 25 moves in a plane substantially orthogonal to tracking plane 23, between a first limit position spaced from pivotal axis 22, defined by the unexpanded length of beam 26 and the geometry of beam 26 and mounts 27, and a second limit position, spaced farther from axis 22, defined by the maximum expanded length of beam 26 and the geometry of beam 26 and mounts 27.

A second weight, bias mass 29, is attached to the center of a second buckling beam 31 supported between a second pair of rigid mounts 32 at the easterly edge of collector 21. Beam 31 and mounts 32 are functionally similar to beam 26 and mounts 27, except that beam 31 is disposed to curve eastwardly on thermally induced expansion. Thus, bias mass 29 likewise moves between a first limit position spaced from axis 22 and a second limit position spaced farther from axis 22.

Bias mass 29 is somewhat heavier than balance mass 25, or may be positioned farther from pivotal axis 22, to create a torque in an easterly direction greater than that exerted in the opposite direction by balance mass 25, when both masses are in their respective first limit positions.

A pair of shields 34 and 35 are mounted to collector 21 extending over beams 26 and 31, respectively. These shields are positioned to shield their associated beams from the sun's direct rays when the apparent position of the sun lies in the tracking plane 23, that is, when the sun's radiation is impinging on collector 21 at the optimum angle, and to expose one or the other of the beams to its direct rays when the sun's apparent position is to the West or East of the tracking plane.

Figure 4:
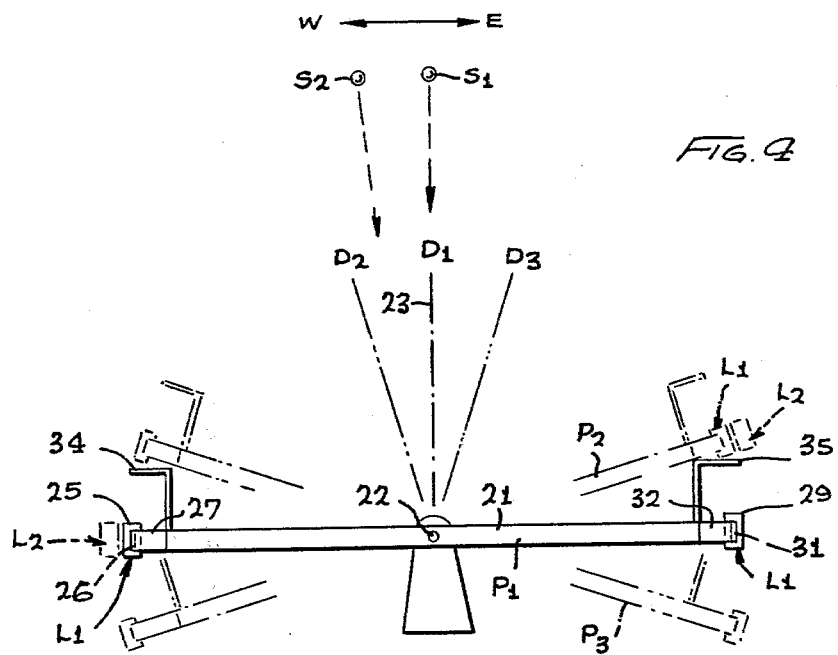
FIG. 4 is a diagramatic end view of the device shown in FIG. 3.

FIG. 4 illustrates diagramatically in exagerated detail the operation of the shields and their associated beams. With the collector 21 in the arbitrarily chosen position designated $P_1$, the tracking plane 23 is aligned in the direction $D_1$, pointing at the sun's apparent location $S_1$. The sun's rays are interdicted by both of shields 34 and 35, and both of the beams 26 and 31 remain in relatively cool shadow. The masses 25 and 29 are in their respective first limit positions $L_1$.

Assuming that at $L_1$ the two masses 25, 29 are equidistant from pivotal axis 22, and that bias mass 29 is somewhat heavier than balance mass 25, the net moment of force about pivotal axis 22 urges collector 21 in the eastward direction (clockwise in FIG. 4), and the collector would normally begin to rotate eastwardly.

Disregarding for the time being the eastward-biasing effect of bias mass 29, in time the earth's rotation causes the apparent position of the sun to move from $S_1$ to $S_2$. Shields 34 and 35 are designed and positioned to expose beams 26 and 31 to the sun's direct radiation when the angular misalignment between tracking plane 23 and the sun's relative apparent position exceeds a predetermined value. Assuming this value is exceeded when the sun is in relative apparent position $S_2$, incident radiation heats exposed beam 26, causing it to bow outwardly and carry balance mass 25 in the direction of its second limit position $L_2$.

As balance mass 25 is borne away from pivotal axis 22, the torque opposing the eastward rotational tendency of bias mass 29 increases until the net moment about axis 22 favors westward (counter-clockwise) rotation. Under the influence of this moment, collector 21 begins to rotate in this direction. It will continue to rotate as long as balance mass 25 remains in its second limit position $L_2$ with bias mass 29 still in its first limit position $L_1$.

As collector 21 rotates farther, beam 31 is exposed to the sun's direct radiation and bows outwardly carrying bias mass 29 toward, and eventually into its second limit position $L_2$. As bias mass 29 is borne away from pivotal axis 22, the torque opposing the westward rotation caused by the unbalancing effect of mass 25 increases until eventually the net moment about axis 22 is in the opposite direction, its westward rotation opposed by this new moment of force, collector 21 comes to rest in a position $P_2$ in which its tracking plane 23 is pointed in a direction $D_2$ to the West of the sun's apparent position $S_2$.

Now responding to the eastward overbalancing of bias mass 29, collector 21 begins to rotate in the opposite or eastward direction. The rotational moment will be greater and the system's reaction rate faster, if shield 34 is positioned to shade beam 26 early in each westward rotational cycle.

Again, by the time collector 21 comes to a halt in position $P_3$, tracking plane 23 has moved beyond the sun's apparent position $S_2$, necessitating further rotation to the West. In this manner, by making a series of alternating westerly and easterly corrections in response to continuously sensed error signals, the most rudimentary embodiment of the subject invention is capable of tracking the sun in its diurnal path with considerable accuracy. As will be seen, more rapid response and even great accuracy are achieved with other embodiments.

Figure 5:
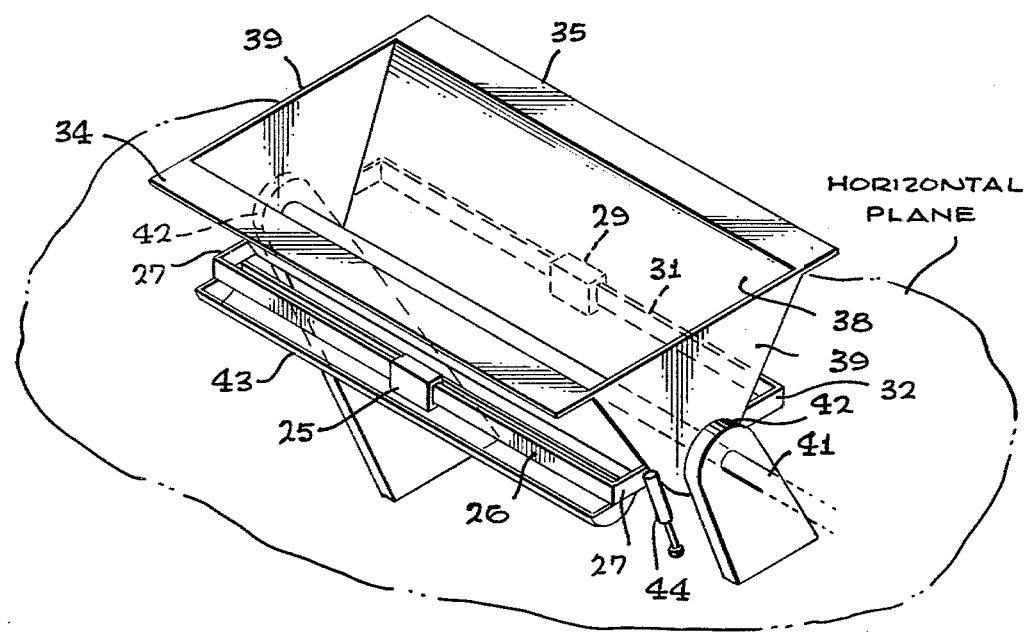
FIG. 5 is a top perspective view of a solar heater embodying the invention.

FIG. 5 illustrates a preferred embodiment of the invention in which the more sophisticated collector in the form of an elongated parabolic mirror 38 is supported by end plates 39 and suspended on a pipe 41 which serves both as the pivotal axis of the mirror and the heat collector through which a heat absorbing fluid flows. For optimum heat collection, the pipe 41 is preferably positioned on the focal axis of the mirror 38. For ease in rotation, the center of gravity of the entire rotatable component should lie on the axis of rotation. Since the pipe 41 is fixed, some form of bearing 42 is provided in the end plates 39 to afford the maximum freedom of rotation to mirror 38.

As in the previously described embodiment, buckling beams 26, 31 are supported between rigid mounting plates 27, 32 respectively, and predisposed to bow away from the mirror 38 when heated. A balance mass 25 is secured to beam 26, and a bias mass 29 to beam 31.

Depending on the size and shape of mirror 38, its outwardly extending sides may serve adequately to shield beams 26 and 31 from the sun. If necessary, a pair of shields 34 and 35 may be provided, extending outwardly of the sides of mirror 38 to shade the beams in the manner previously described.

The operation of the tracking mechanism of this embodiment is substantially identical with that of the preceding embodiment (it being understood that the tracking plane of mirror 38 is the mirror's plane of symmetry), and need not be elaborated upon further.

To reduce the reaction time of the system, an auxiliary reflector 43 is mounted on the westerly side of the mirror 38, below beam 26, and is arranged so that it focuses incident sunlight onto that beam. To make for smoother, more accurate tracking with less overshooting, more or less conventional damping means 44 are incorporated in the suspension system for controlling the angular rate of rotation of mirror 38. Preferably, the damper 44 is of the differential type, providing for somewhat more rapid rotation westwardly than eastwardly.

Thoughtful reflection on the basic use and function of the invention discloses that it is possible to dispense with the expansible beam 31 and to replace moveable bias mass 29 with a fixed mass and still achieve the desired objects.

Figures 6A, 6B, 6C:
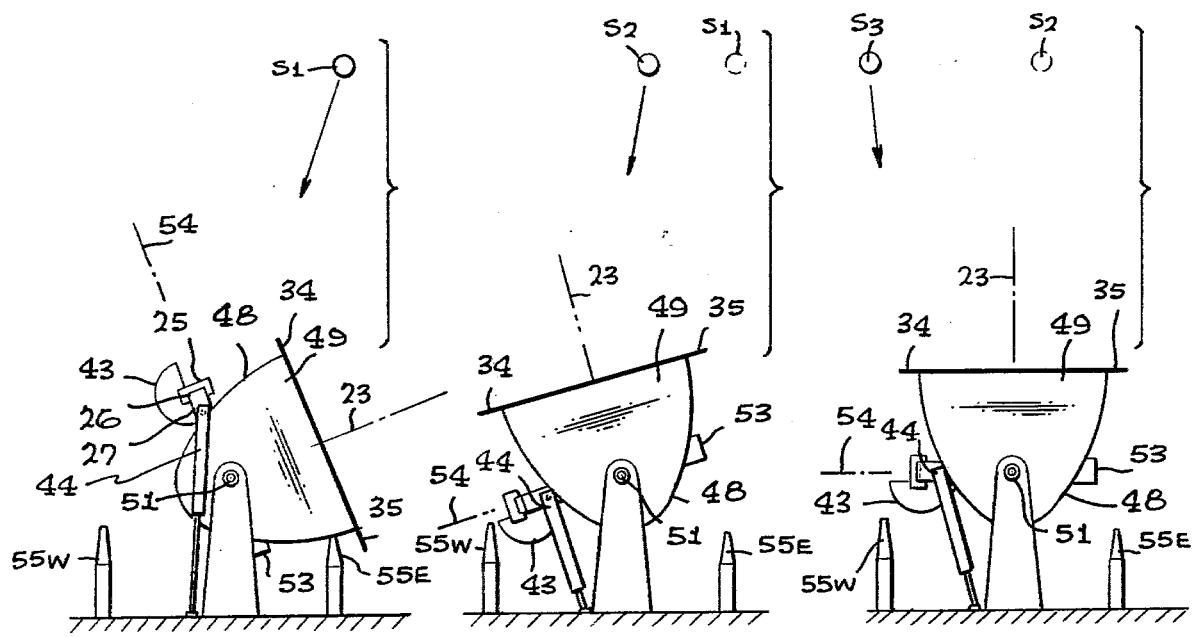
FIGS. 6a, 6b and 6c are diagramatic end views of another solar heater, illustrating the operation of the invention.

FIGS. 6a, 6b and 6c illustrate in exagerated diagramatic form both this alternative construction and its operation, in connection with a typical parabolic-trough collector similar to that shown in FIG. 5. As in that device, this collector includes an elongated parabolic mirror 48 having end plates 49 through bearings in which the heat collecting pipe 51 is journaled. As in both of the previous embodiments, a balance mass 25 is fixed to buckling beam 26 which in turn is supported between rigid mounts 27. In place of the similarly constructed bias mass 29, beam 31 and mounts 32 of the previous embodiments, a single fixed weight 53 is firmly attached to the easterly side of mirror 48, preferably in an imaginary control plane 54 which contains the pivotal axis of rotation of mirror 48 and balance mass 25, supporting beam 26 and its mounts 27. As in the previous embodiment, an auxiliary reflector 43 for enhancing the response rate of beam 26, and differential damper 44 are likewise provided. They function in precisely the manner as previously described.

It should be noted that it is neither practicable nor desirable to permit the mirror 38 to rotate from eastern horizon to western horizon. From a mechanical standpoint, if the control plane 54 were allowed to come into substantial alignment with the local gravitational vector at the collector site, the available net torque would be reduced to zero and the tracking device immobilized. To avoid this problem, motion-limiting means, such as mechanical stops 55 or any other suitable means are provided for restricting rotational movement of mirror 48 when its tracking plane 23 comes within 10°–20° of either horizon. This limitation does not seriously denigrate the utility of the tracking device, since at low early-morning and late-afternoon slant angles, atmospheric interference reduces the amount of usable infrared solar radiation available to such a low level that the loss of some portion of it through inefficiency resulting from misalignment of the tracking plane and the early-morning or late-afternoon sun is inconsequential.

As shown in FIG. 6a, with fixed bias mass 53 carefully selected and positioned to impart an eastwardly directed turning moment which is slightly greater than the westward turning moment produced by balance mass 25 in its first limit position. In the absence of solar thermal input to beam 25, mirror 48 will tend to rotate eastwardly until its rotation is arrested by stop $55_E$. The apparatus will remain in this position until the morning sun has risen to some predetermined apparent position $S_1$ beyond which the shield 34 no longer shades beam 26 from the sun's direct rays. Theretofore, although mirror 48 remained stationary, it was nonetheless utilizing at least a portion of the sun's radiation for heating purposes. It was merely doing so with a varying degree of efficiency.

Once the sun reaches apparent position $S_1$, the operation of the tracking system is quite straightforward and quite similar to the operation of the embodiments previously described, the principal difference being that with bias mass 53 fixed, reflector 43 augmenting the heating of beam 26, and damper 44 regulating the rate of rotation in both directions, the tracking device's rate of response to movement of the apparent position of the sun is much faster than that of the earlier embodiments, and the tracking accuracy of the system is much greater.

As shown in exaggerated form in FIG. 6b, while balance mass 25, moved to its second limit position by the radiant heating of beam 26, overcomes the eastward torque effect of mass 53 and causes mirror 48 to rotate into the position shown, the sun has moved from apparent position $S_1$ to position $S_2$. Although tracking plane 23 is still not aligned precisely with position $S_2$, its angular displacement is quite small. Similarly, while the sun is moving from the orientation shown in FIG. 6b to that shown in FIG. 6c, the apparent position of the sun is moving from $S_2$ to $S_3$, from which point its direct rays again impinge on beam 26.

Figure 7:
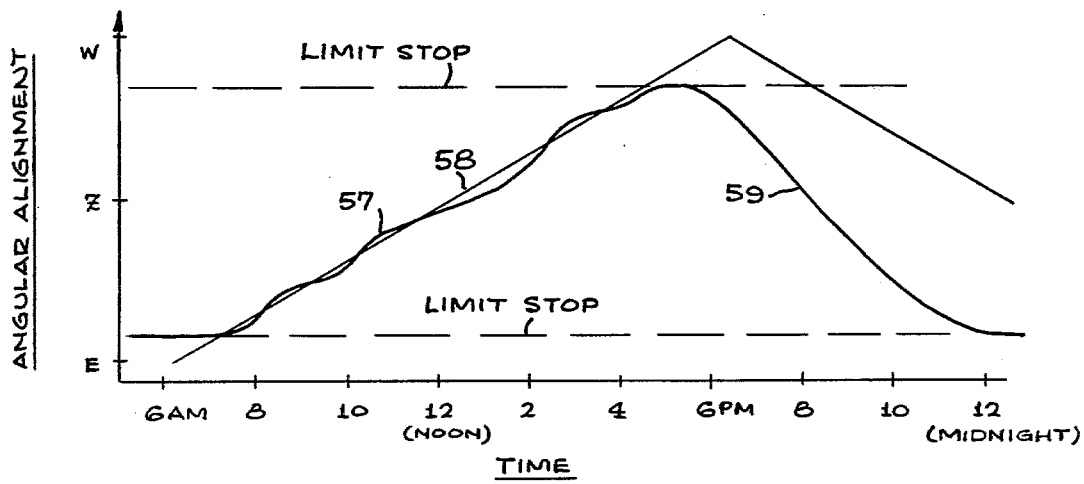
FIG. 7 is a graphic representation of the typical diurnal angular orientation path of a solar tracking device embodying the invention.

Despite the rapid response rate and accuracy of the embodiment shown in FIGS. 6a–6b as seen in FIG. 7, the actual tracking path followed by tracking plane 23 is represented by a relatively flat but nonetheless sinusoidal line 57, which closely approximates but necessarily varies to the East and West of line 58 representing the apparent diurnal path of the sun.

As clearly shown in FIG. 7, in the late afternoon, the westward tracking motion of mirror 48 is halted by stop 55W. Shortly thereafter, the waning strength of the sun's atmospherically refracted and scattered rays allows beam 26 to return the balance mass 25 to its first limit position. The eastwardly directed torque of fixed mass 53 then becomes the predominant influence, and mirror 48 returns to its rest position against stop 55E at the eastward end of its arc, in readiness for the next morning's sunrise.

Figure 8:
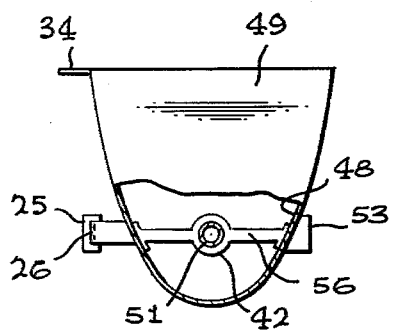
FIG. 8 is a cross-sectional view of a solar heater, illustrating alternative support means for the mirror.

FIG. 8 illustrates an alternative method for supporting the apparatus shown in FIGS. 6a-6c for rotation around the fluid conduit 51. Instead of, or in addition to, the bearings in end plates 49, two or more mounting brackets 56 secured to the inner wall of mirror 48 carry bearings 42 through which the pipe 51 is journalled.

Figure 9:
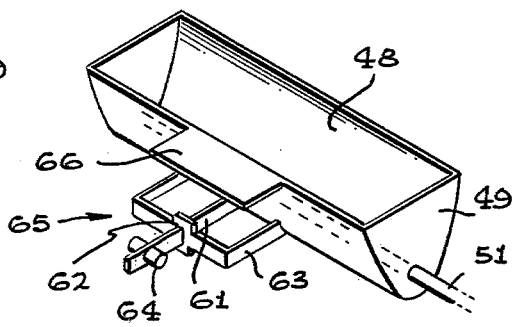
FIG. 9 is a top perspective view of a solar heater illustrating another embodiment of the invention.

FIG. 9 shows another embodiment of the invention, in which the primary balance mass positioning means 65 takes the form of a single, rigid, thermally expansible bar or rod 61 attached firmly at one of its ends to the westerly side of mirror 48 and extending from that side orthogonally of the tracking plane (the plane of symmetry of mirror 48). Bar 61 is supported in a slot 62 in the end piece of a rigid support bracket 63. Balance mass 64 is mounted to the free end of bar 61 and is moved between first and second limit positions by the lengthening of bar 61 in response to impinging direct solar radiation. Shield 66 may be mounted to mirror 48 to serve the function described in connection with the previously mentioned embodiments.

Figure 10:
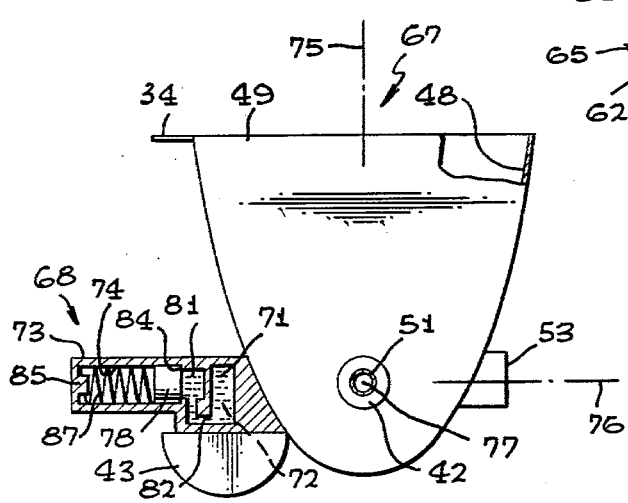
FIGS. 10 and 11 are cross-sectional views of solar heaters illustrating two further embodiments of the invention.

FIG. 10 illustrates another embodiment of the invention, in this case one which utilizes hydraulic means to move the balancing mass between its first and second limiting positions. For descriptive purposes this embodiment is shown mounted to a solar collector 67 having an elongated mirror 48 in the form of a trough of parabolic cross-section. End plates 49 contain bearings 42 through which the supporting fluid conduit and axle 51 is journalled. As in the immediately preceding embodiment, bias mass 53 is fixed to the easterly side of the mirror 48, and primary balancing mass positioning means 68 is mounted to the westerly side.

Positioning means 68 comprises a fluid reservoir 71 containing a volatile fluid 72, and an hydraulic cylinder 73 having an axial bore 74. Reservoir 71 and cylinder 73 are preferably formed as a unitary assembly for ease in mounting by any suitable conventional means to the side of mirror 62.

Primary positioning means 68 is attached rigidly with the bore 74 of cylinder 73 orthogonal to the tracking plane 75, the plane of symmetry of mirror 62. Preferably, bias mass 53 and bore 74 lie in the control plane 76 containing the pivotal axis 77.

Balance mass 78 is formed as a freely reciprocable piston in sliding fluid-tight contact with the inner walls of bore 74. Piston 78 defines an expansion chamber 81 at one end of bore 74, and this chamber is connected through a duct 82 to the lower end of reservoir 71. Motion limiting means, such as annular shoulder 84 and buttress 85, formed in bore 74, limit the axial travel of piston 78 and define first and second limit positions, respectively, for piston 78. A compression spring 87 in one end of bore 74 urges piston 78 into its first limit position, and hydraulic pressure exerted by fluid 72 in reservoir 71 and chamber 81 urges piston 78 into its second limit position.

Reservoir 71 is preferably formed as a sealed, thin-walled pressure vessel out of a material, such as clear glass, exhibiting little heat retention capacity and a high degree of thermal conductivity. Alternatively, it may be made of any suitable infrared-transparent material which will allow solar radiation to heat the fluid 72 by direct radiation. Likewise, any other construction may be used which will permit impinging solar radiation to heat the fluid 72 rapidly but will not act as a heat sink or retain absorbed heat.

The fluid 72 may be any of the well-known volatile or expansive hydrocarbons or fluorocarbons, such as those used in conventional heat exchange systems. It may be in liquid form as shown in FIG. 10, or a gas. Preferably it must be highly responsive on exposure to thermal energy, chemically inert, and generally usable for pressure generation and transmission in a closed hydraulic or pneumatic environment.

If required by the configuration of mirror 48, a shield 34 may be attached to mirror 48 and positioned to shade reservoir 71 in the same manner and for the same purposes as described in connection with the previously illustrated embodiments.

In operation, when reservoir 71 is exposed to direct solar radiation, the fluid 72 is volatilized, or, if already in gaseous form, expanded, to increase the pressure within the reservoir and chamber 84, thereby overcoming the resistance of spring 87 and thereby urging balance mass 78 in the direction of its second limit position. As in the previously described embodiments, the resulting lengthening of the imaginary lever arm through which balance mass 78 acts on pivotal axis 77 overcomes the eastwardly directed moment of force associated with fixed bias mass 53, thereby causing mirror 48 to rotate westwardly. When this westward rotation carries reservoir 71 into the shade of mirror 48 or shield 34, fluid 72 rapidly cools, thereby lowering the pressure in chamber 84 and reservoir 71 and allowing spring 87 to return balance mass 78 to its first limit position. In the manner described previously, the continuing interplay between balance mass 78 as controlled by primary positioning means 68 and bias mass 53, in combination with appropriately selected damping means (not shown) and auxiliary reflector 43, provide a highly responsive, extremely accurate solar tracking system.

Figure 11:
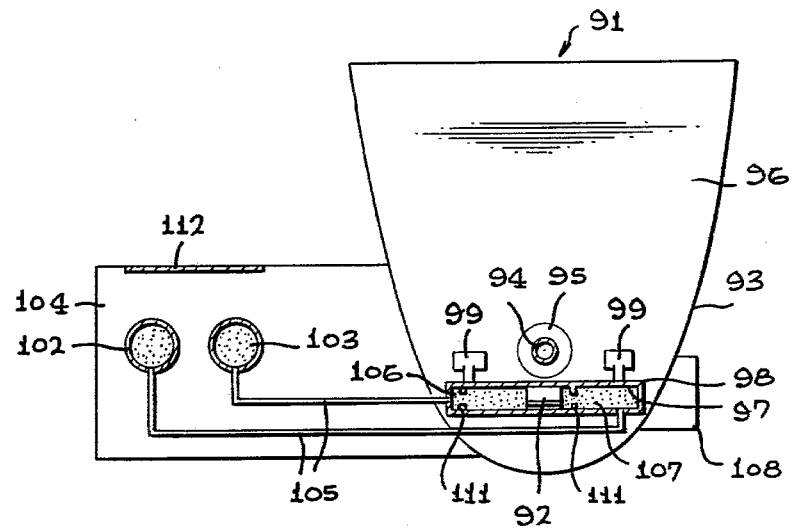

FIG. 11 illustrates a solar heater 91 utilizing another embodiment of the tracking device in which the position and movement of the balance mass 92 are controlled by hydraulic means. Here again the heater is in the form of an elongated mirror 93 supported for rotation about north-south oriented pipe 94 on bearings 95 in end plates 96.

Balance mass 92 is formed as a piston freely reciprocable in the bore 97 of cylinder 98 secured to end plate 96. Cylinder 98 is disposed with bore 97 orthogonal with respect to the tracking plane (plane of symmetry) of mirror 93. Preferably, cylinder 98 is mounted to end plate 96 by means of offset mounting brackets 99 which are affixed to end plate 96 substantially in the control plane.

Motivating force for positioning balance weight 92 is provided by fluid reservoirs 102, 103 mounted to the westerly side of mirror 93 by suitable mounting means such as bracket 104. Reservoirs 102, 103 are connected by ducts 105, of equal length, to chambers 106, 107, respectively, defined in bore 97 by balance mass 92.

Reservoirs 102, 103 contain an hydraulic fluid, preferably a high volatile liquid having the characteristics outlined in connection with the embodiment shown in FIG. 10. Alternatively, reservoirs 102, 103 may be charged with an inert gas having a high coefficient of thermal expansion, trapped over a non-reactive hydraulic fluid in communication with chambers 106, 107, or the entire enclosed system may be completely filled with a non-volatile fluid having a high coefficient of thermal expansion.

A bias mass, weight 108 is fixed, preferably on the control plane, to the easterly side of mirror 93 to give the entire apparatus 91 a slight eastward bias when balance mass 92 is in some predetermined first limit position, preferably at or near the middle of cylinder 98. Annular buttresses 111 or similar stop means may be provided on the inner wall of bore 97 to establish this first limit position and a second limit position spaced westwardly from the first limit position. In the second limit position balance mass 92 overcomes the torque of bias mass 108 and gives the system a westward turning moment.

Reservoir 103 may be contained in a sunlight-proof enclosure, but preferably both reservoirs 102, 103 are covered by a shield 112 which protects them from direct exposure to the sun's rays when the tracking plane of heater 91 is in alignment with the sun's apparent instantaneous position. When the tracking plane is misaligned to the east of that position, direct solar radiation falls on reservoir 102, heating its contents, and thereby forcing piston 92 toward its second limit position. Under the influence of balance mass 102, the assembly is rotated westwardly, its motion restrained by the damping means referred to earlier. Should the apparatus overshoot the sun's apparent position, reservoir 102 and its contents immediately fall into the shadow cast by shield 112 and reservoir 103 and its contents are exposed to the sun's direct radiation and the expanding fluid therein almost immediately begins forcing balance mass 92 toward its first limit position. By this means the system's response to errors in alignment is greatly enhanced. It may be enhanced still further by the provision of auxilliary reflectors 113 positioned to direct the sun's rays into reservoirs 102, 103.

As with the previously described embodiments of the invention, at the end of each day the heater 91 is at rest against the westerly stop described earlier. As the strength of the radiation sensed by the contents of reservoir 102 diminishes, the fluid system begins to come to a state of equilibrium, urging balance mass 92 in the direction of its first limit position. Eventually mass 92 comes to rest in that position and the unbalanced eastwardly moment provided by bias mass 108 slowly rotates the heater 91 eastwardly until it comes to rest against the easterly stop.

Figure 12A:
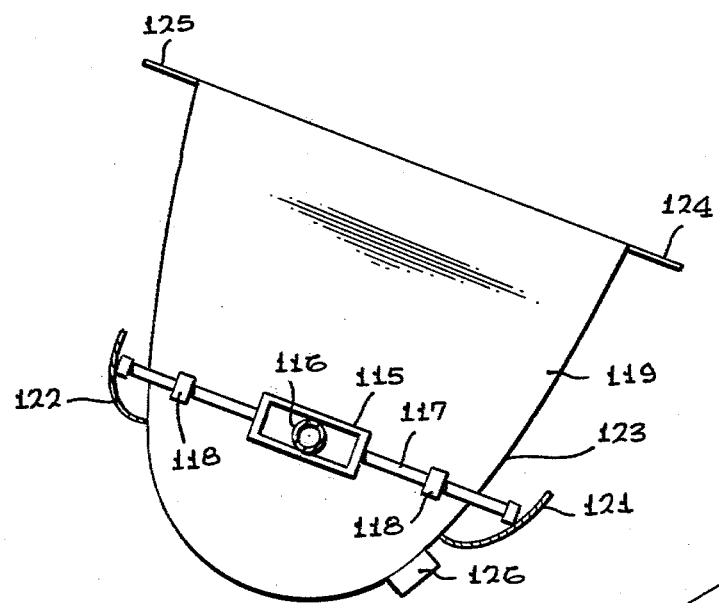
FIGS. 12a and 12b are diagramatic end views of a solar tracking device illustrating the operation of yet another embodiment of the invention.
Figure 12B:
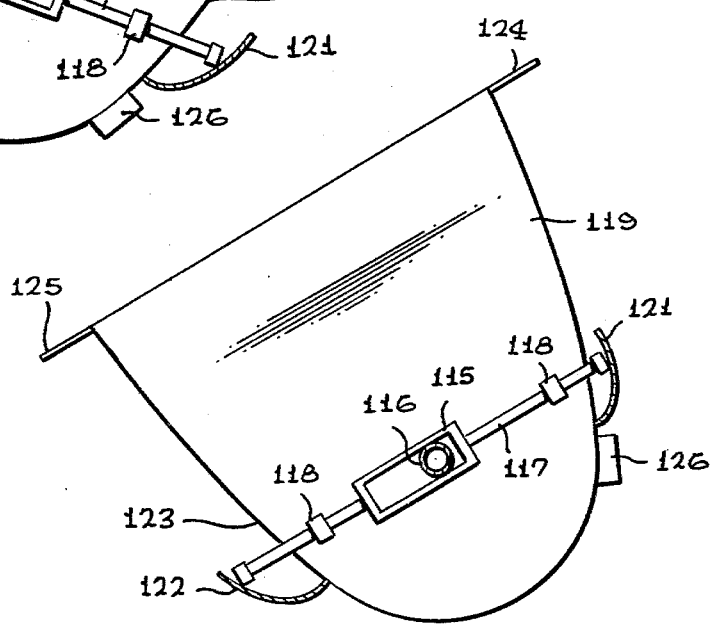

FIGS. 12a and 12b illustrate one embodiment of a form of the invention in which the propensity of a bimetallic strip to bend when exposed to direct solar radiation is used to control and position the balance mass 115. Here this mass is mounted to reciprocate along the control plane over fluid pipe 116. It is supported by rods 117 slidably supported by brackets 118 secured to end plate 119. The ends of rods 117 are in contact with curved resilient bimetallic arms 121, 122. Arms 121 and 122 are secured to opposite sides of mirror 123 and positioned to center mass 115 when they are at the same temperature. They are constructed to bow outwardly of the walls of mirror 123 when they are heated by incident solar thermal radiation. Thus, in the position shown in FIG. 12a, mirror 123 is inclined easterly of the sun's apparent position and arm 122 is exposed to insolation. Heated by the sun's rays, arm 122 bows westwardly, allowing the resilient force exerted by arm 121 to move balance weight 115 to the position shown in FIG. 12b, thereby causing the mirror 123 to rotate westwardly toward alignment with the sun.

Shield 124 keeps arm 121 in shadow unless and until the tracking plane of mirror 123 passes the sun's apparent location. At that point shield 125 casts its shadow on arm 122 and the sun's rays fall on arm 121, thereby allowing the normal resiliency and thermal relaxation of arm 122 and the outward bowing of arm 121 to force balance weight 115 eastwardly to counteract the westward rotation of mirror 123.

As in the previous examples, by properly selecting the materials and location of bimetallic arms 121, 122, the characteristics of appropriate damping means, and other components of the system, quick response and accuracy in tracking are readily achieved. Likewise, as in the previously described embodiments, a bias mass, fixed weight 126, may be attached to the easterly side of the mirror to insure the automatic return of the mirror to its eastwardly-facing orientation at the end of each diurnal cycle.

FIG. 13 illustrates a variant of the embodiment shown in FIGS. 12a and 12b, in which a compression spring 127 positioned between a rigid mounting bracket 128 and the easterly end of rod 117 is substituted in place of arm 121 to urge balance mass 115 against arm 122. Here the movement of arm 122 controls the position of mass 115.

FIG. 14 illustrates a heliostatic apparatus in which the tracking system of the subject invention is used not only to follow the apparent movement of the sun along its diurnal track, but to correct for daily movements in the track as the sun progresses through the ecliptic as well.

A solar collector 131 incorporating any of the previously described embodiments of the basic tracking means previously described (here the embodiment of FIGS. 6a–6c) is mounted to a tracking platform 132 with its pivotal axis 133 parallel to the plane of tracking platform 132. Platform 132 is pivotally mounted to the earth for rotation about an east-west oriented axis 134 orthogonal to the earth's local gravitational vector and to the north-south pivotal axis of the solar collector 131. Tracking platform 132 is provided with tracking means such as those illustrated in FIG. 3 controlling the rotation of platform 132 about axis 134 in response to misalignment of a reference or tracking plane 135 containing axis 134 and orthogonal to the tracking plane 136 of collector 131.

It will be apparent from a consideration of FIG. 14 and the previous description of the operation of the tracking mechanism that balance mass 137 and bias mass 138 will continuously and automatically rotate tracking platform 132 to compensate for the apparent daily declination or ascension of the sun's path as it moves between the summer solstice $E_s$ and the winter solstice $E_w$. In this manner, the tracking system of the subject invention maintains the collector 131 in the optimum orientation for most efficient utilization of the available solar energy, i.e., with both axes of rotation normal to the incident solar radiation.

In FIG. 15, the tracking mechanism of the invention is employed in a somewhat different manner to control the instantaneous position and rotation about two axes of a parabolic dish collector 139. Collector 139 is rotatably mounted to gimbal ring 148 by means of pins 149 lying on an imaginary north-south axis of rotation. Gimbal ring 148 in turn is mounted to rotate about an imaginary east-west axis of rotation on earth-supported pylons 153.

Arcuate slotted, thermally-expansive beams 154, 155 are supported by rigid brackets 156 extending radially outwardly of the wall of collector 139 and carry balance masses 157, 158, respectively, positioned generally in the southwest and northwest quadrants of collector 134. Bias mass 159 is secured to the east-facing side of collector 139. Preferably, beams 154, 155, pins 149 and bias mass 159 lie in an imaginary control plane.

Annular shield 161 extends outwardly of the wall of collector 139 over beams 154, 155 and shades them from direct solar radiation when the central axis 162 of collector 139 is aligned with the line of sight to the sun's apparent instantaneous position. Auxiliary reflectors under beams 154, 155 (not shown) may be provided to enhance the heating effect of the sun's radiation, or beams 154, 155 may be coated or painted with a black heat-absorbing material to achieve the same result.

When axis 162 is misaligned to the north or east of the solar disc, beam 154 is exposed to the sun's direct rays and on thermal expansion causes balance mass 157 to move radially outwardly of collector 139, from its normal first limit position to a second limit position spaced farther than the first limit position from one or both axes of rotation. Similarly, when axis 162 is misaligned to the south or east of the solar disc, balance mass 158 is moved outwardly of collector 139 from a normal first limit position to a second limit position more remote from one or both axes of rotation.

Bias mass 159 is selected and positioned to exert greater eastward torque than the combined effective westward torque of masses 157 and 158, when the latter are in their first limit positions. Masses 157, 158 are adapted to exert greater combined westward torque than mass 159, when they are in their second limit positions.

It will be understood from a consideration of FIG. 15 that by this arrangement the interaction of balance masses 157 and 158 and bias mass 159 effectively maintains the axis 162 of collector 139 in substantially continuous alignment with the sun's ever-changing apparent position. Additionally, by careful selection and positioning of balance masses 157, 158 bias mass 159 and shield 161 in the manner previously described in connection with the preceding embodiments of the invention, collector 139 may readily be adapted to return automatically to an eastwardly-facing position at rest against a stop 55$_E$, when the masses 157, 158 reassume their first limit positions at the end of each diurnal cycle.

Preferably, steps 55S and 55N (not shown) are positioned below gimbel ring 148 at or near the southern and northern azimuths, to prevent collector 139 from rotating beyond some predetermined elevation during the nocturnal period, or when the sun is obscured.

FIG. 16 illustrates one of the numerous alternative uses to which the tracking device of this invention may be applied. In this instance it is employed as a control mechanism 141 for controlling the position of an array of louvres 142 such as might be used over the windows in a building to admit light while shielding the interior from the heating which would otherwise result from direct insolation. The control mechanism 141 is simply a passive structure 143, mounted for rotation about a north-south axis 144 under the influence of a moveable balance mass 145 and a bias mass 146 in accordance with the construction and operation of any of the foregoing embodiments of the invention.

Louvres 142 are carried on vertical supports 151 adapted for rotation about vertical axes. A conventional system of linkages 152, which may be mechanical, hydraulic, or any other convenient form, is connected between the axis of rotation of the sun-tracking structure 143 and vertical supports 151, and rotates louvres 142 in response to the diurnal motion of the sun. It will be appreciated that louvres 142 may be adjusted to allow any desired amount of ambient light or direct thermal radiation to pass, and control mechanism 141 will maintain this predetermined mix of lighting and heating throughout the day.

From the foregoing description of several of its preferred embodiments it will be apparent that the principal feature of the subject invention is the provision of means, in various forms, effectively utilizing the displacement of the center of gravity of a tracking body with respect to its axes of rotation, in thermal response to incident solar radiation, for tracking the apparent motion of the sun about those axes. Additionally, the invention employs the same or similar means for re-indexing the tracking body at the end of each diurnal cycle. The particular constructions and uses described herein have been selected for illustrative purposes and are not intended to limit the scope or applicability of the invention as it is defined in the following claims.

What I claim is:

1. In an apparatus including a passive body having a predetermined generally north-south oriented tracking plane associated therewith, said body being suspended for rotation about a primary pivotal axis lying in said tracking plane in close proximity to the center of mass of said body and inclined with respect to the local gravitational vector, self-contained, self-regulating solar energy-operated tracking means for rotating said body about said axis and maintaining said tracking plane in substantially continuous alignment with the apparent instantaneous position of the sun during successive diurnal transits thereof, said tracking means comprising:

at least one balance mass movably attached to said body and reciprocable between a first limit position and a second limit position spaced from said tracking plane and lying in a control plane containing said primary pivotal axis and oriented substantially orthogonally to said tracking plane;

heat-sensitive primary positioning means acting on said balance mass and moving said balance mass between said first and second limit positions in response to direct solar radiation impinging on said primary positioning means; and shielding means associated with said body, alternatingly shielding said primary positioning means from direct solar radiation when said tracking plane is substantially aligned with the apparent instantaneous position of the sun, and exposing said primary positioning means to direct solar radiation when said tracking plane is not so aligned, whereby said body is urged to rotate about said primary pivotal axis in the direction of the apparent diurnal motion of the sun.

2. The tracking means of claim 1, further comprising stop means associated with said body, limiting the rotation of said body and thereby preventing the alignment of said control plane with the local gravitational vector.

3. The tracking means of claim 2, further comprising damping means associated with said body controlling the rotational velocity of said body about said primary pivotal axis.

4. The tracking means of claim 3, further comprising bias mass attached to said body and spaced from said primary pivotal axis, said bias mass opposing said balance mass and predisposing the alignment of said tracking plane with the apparent instantaneous position of the rising sun.

5. The tracking means of claim 4, wherein said primary positioning means comprises:
a buckling column having said balance mass affixed thereto; and
rigid spaced support means affixed to said body and supporting said buckling column for buckling movement between said first and second limit positions in response to direct solar radiation impinging thereon.

6. The tracking means of claim 4, wherein said primary positioning means comprises:
a heat-sensitive bimetallic beam having said balance mass affixed thereto, and
rigid spaced support means affixed to said body and supporting said bimetallic beam for bending movement between said first and second limit positions in response to direct solar radiation impinging thereon.

7. The tracking means of claim 4, wherein said primary positioning means comprises at least one heat sensitive expansion beam affixed at one of its ends to said body, extending laterally of said body substantially orthogonally to said primary pivotal axis, and having said balance mass affixed thereto.

8. The tracking means of claim 4, wherein:
said primary positioning means comprises an hydraulic cylinder affixed to said body substantially orthogonally of said primary pivotal axis, at least one sealed pressure vessel containing a fluid under pressure, and a fluid conduit connecting said cylinder with said pressure vessel and maintaining said fluid in continuous communication with said cylinder;
said balance mass comprises a piston freely reciprocable in said cylinder between said first and second limit positions, said piston being urged toward one of said limit positions in response to an increase in the pressure acting on the fluid in said pressure vessel;
bias means associated with said cylinder urge said piston toward the other of said limit positions; and
said shielding means is positioned to expose said pressure vessel to solar radiation and thereby increase pressure within the pressure vessel acting on the fluid therein, when said tracking plane is out of alignment with the apparent instantaneous position of the sun, and to shield said pressure vessel from solar radiation and thereby reduce the said pressure therein, when said tracking plane is in substantial alignment with the apparent instantaneous position of the sun.

9. The tracking means of claim 8, wherein said fluid is a volatile liquid.

10. The tracking means of claim 8, wherein:
said piston defines first and second fluid-tight chambers within said cylinder on opposite sides of said piston, respectively;
said one pressure vessel is connected to one of said fluid-tight chambers;
said bias means comprises a second sealed pressure vessel containing fluid under pressure and connected with the other of said fluid-tight chambers by means of a second fluid conduit whereby the fluid in said second pressure vessel is maintained in continuous communication with the said other of said fluid-tight chambers; and
said shielding means is positioned to shield said second pressure vessel from solar radiation, when said tracking plane is in substantial alignment with the apparent instantaneous position of the sun.

11. In combination with a passive body having a predetermined generally north-south oriented tracking plane associated therewith, said body being suspended for rotation about a primary pivotal axis lying in said tracking plane in close proximity to the center of mass of said body and inclined with respect to the local gravitational vector,
self-contained, self-regulating solar energy-operated tracking means for rotating said body about said axis and maintaining said tracking plane in substantially continuous alignment with the apparent instantaneous position of the sun during successive diurnal transits thereof, said tracking means comprising:
at least one balance mass movably attached to said body and reciprocable between a first limit position and a second limit position spaced from said tracking plane; and lying in a control plane containing said primary pivotal axis and oriented substantially orthogonally to said tracking plane;
heat-sensitive primary positioning means acting on said balance mass and moving said balance mass between said first and second limit positions in response to direct solar radiation impinging on said primary positioning means; and
shielding means associated with said body, alternatingly shielding said primary positioning means from direct solar radiation when said tracking plane is substantially aligned with the apparent instantaneous position of the sun, and exposing said primary positioning means to direct solar radiation when said tracking plane is not so aligned, whereby said body is urged to rotate about said primary pivotal axis in the direction of the apparent diurnal motion of the sun.

12. The combination of claim 11, further comprising stop means associated with said body, limiting the rotation of said body and thereby preventing the alignment of said control plane with the local gravitational vector.

13. The combination of claim 12, further comprising damping means associated with said body controlling the rotational velocity of said body about said primary pivotal axis.

14. The combination of claim 13, comprising a bias mass attached to said body and spaced from said primary pivotal axis, said bias mass opposing said balance mass and predisposing the alignment of said tracking plane with the apparent instantaneous position of the rising sun.

15. The combination of claim 14, wherein said primary positioning means comprises:
a buckling column having said balance mass affixed thereto; and
rigid spaced support means affixed to said body and supporting said buckling column for buckling movement between said first and second limit positions in response to direct solar radiation impinging thereon.

16. The combination of claim 14, wherein said primary positioning means comprises:
a heat-sensitive bimetallic beam having said balance mass affixed thereto; and
rigid spaced support means affixed to said body and supporting said bimetallic beam for bending moveement between said first and second limit positions in response to direct solar radiation impinging thereon.

17. The combination of claim 14, wherein said primary positioning means comprises at least one heat sensitive expansion beam affixed at one of its ends to said body, extending laterally of said body substantially orthogonally to said primary pivotal axis, and having said balance mass affixed thereto.

18. The combination of claim 14, wherein:

said primary positioning means comprises an hydraulic cylinder affixed to said body substantially orthogonally of said primary pivotal axis, at least one sealed pressure vessel containing a fluid under pressure, and a fluid conduit connecting said cylinder with said pressure vessel and maintaining said fluid in continuous communication with said cylinder;

said balance mass comprises a piston freely reciprocable in said cylinder between said first and second limit positions, said piston being urged toward one of said limit positions in response to an increase in the pressure acting on the fluid in said pressure vessel;

bias means associated with said cylinder urge said piston toward the other of said limit positions; and said shielding means is positioned to expose said pressure vessel to solar radiation and thereby increase pressure within the pressure vessel acting on the fluid therein, when said tracking plane is out of alignment with the apparent instantaneous position of the sun, and to shield said pressure vessel from solar radiation and thereby reduce the said pressure therein, when said tracking plane is in substantial alignment with the apparent instantaneous position of the sun.

19. The combination of claim 18, wherein said fluid is a volatile liquid.

20. The combination of claim 18, wherein:

said piston defines first and second fluid-tight chambers within said cylinder on opposite sides of said piston, respectively;

said one pressure vessel is connected to one of said fluid-tight chambers;

said bias means comprises a second sealed pressure vessel containing fluid under pressure and connected with the other of said fluid-tight chambers by means of a second fluid conduit whereby the fluid in said second pressure vessel is maintained in continuous communication with the said other of said fluid-tight chambers; and said shielding means is positioned to shield said second pressure vessel from solar radiation, when said tracking plane is in substantial alignment with the apparent instantaneous position of the sun.

21. In combination with a passive body having a predetermined tracking line of sight associated therewith, said body being suspended for rotation about a primary pivotal axis passing through said tracking line of sight, substantially orthogonal thereto, in close proximity to the center of mass of said body and inclined with respect to the local gravitational vector, and being further suspended for rotation about a secondary pivotal axis passing through said tracking line of sight, substantially orthogonal to said axis and to said primary pivotal axis, in close proximity to the center of mass of said body and inclined with respect to the local gravitational vector, self-contained, self-regulating solar energy-operated tracking means for rotating said body about said primary and secondary pivotal axes and maintaining said tracking line of sight in substantially continuous alignment with the apparent instantaneous position of the sun during successive diurnal transits thereof throughout the solar ecliptic, said tracking means comprising:

at least one balance mass movably attached to said body and reciprocable between a first limit position and a second limit position spaced from said primary pivotal axis;

at least one other balance mass movably attached to said body and reciprocable between a first limit position and a second limit position spaced from said secondary pivotal axis;

heat sensitive primary positioning means acting on said balance masses and moving said balance masses between their said first and second limit positions in response to direct solar radiation impinging on said primary positioning means; and shielding means associated with said body, alternatingly shielding said primary positioning means from direct solar radiation when said tracking line of sight is substantially aligned with the apparent instantaneous position of the sun, and exposing primary positioning means to direct solar radiation when said tracking line of sight is not so aligned, whereby said body is urged to rotate about said primary and secondary pivotal axes in the direction of the apparent diurnal motion of the sun throughout the solar ecliptic.

22. The combination of claim 21, comprising a bias mass attached to said body and spaced from said primary pivotal axis, said bias mass opposing said balance masses and predisposing the alignment of said tracking line of sight with the apparent instantaneous position of the rising sun.

23. The combination of claim 22, wherein said primary positioning means comprise a pair of buckling columns having said balance masses affixed thereto, respectively; and rigid spaced support means affixed to said body and supporting said buckling columns for buckling movement between their said respective first and second limit positions in response to direct solar radiation impinging thereon.

24. In an apparatus including a passive body having a predetermined generally north-south oriented tracking plane associated therewith, said body being suspended for rotation about a primary pivot axis lying in said tracking plane in close proximity to the center of mass of said body and inclined with respect to the local gravitational vector, self-contained, self-regulating solar energy-operated tracking means for rotating said body about said axis and maintaining said tracking plane in substantially continuous alignment with the apparent instantaneous position of the sun during successive diurnal transits thereof, said tracking means comprising:

at least one solid balance mass movably attached to said body and reciprocable between a first limit position and a second limit position spaced from said tracking plane;

heat-sensitive primary positioning means acting on said balance mass and moving said balance mass between said first and second limit positions in response to direct solar radiating impinging on said primary positioning means; and shielding means associated with said body, alternatingly shielding said primary positioning means from direct solar radiation when said tracking plane is substantially aligned with the apparent instantaneous position of the sun, and exposing said primary positioning means to direct solar radiation when said tracking plane is not so aligned, whereby said body is urged to rotate about said primary pivotal axis in the direction of the apparent diurnal motion of the sun.

25. The tracking means of claim 24, wherein said first and second limit positions lie in a control plane oriented substantially orthogonally to said tracking plane.

26. The tracking means of claim 25, wherein said control plane is proximate to and parallel with said primary pivotal axis.

27. In combination with a passive body having a predetermined generally north-south oriented tracking plane associated therewith, said body being suspended for rotation about a primary pivotal axis lying in said tracking plane in close proximity to the center of mass of said body and inclined with respect to the local gravitational vector, self-contained, self-regulating solar energy-operated tracking means for rotating said body about said axis and maintaining said tracking plane in substantially continuous alignment with the apparent instantaneous position of the sun during successive diurnal transits thereof, said tracking means comprising:

at least one solid balance mass movably attached to said body and reciprocable between a first limit position and a second limit position spaced from said tracking plane;

heat-sensitive primary positioning means acting on said balance mass and moving said balance mass between said first and second limit positions in response to direct solar radiation impinging on said primary positioning means; and shielding means associated with said body, alternatingly shielding said primary positioning means from direct solar radiation when said tracking plane is substantially aligned with the apparent instantaneous position of the sun, and exposing said primary positioning means to direct solar radiating when said tracking plane is not so aligned, whereby said body is urged to rotate about said primary pivotal axis in the direction of the apparent diurnal motion of the sun.

28. The combination of claim 27, wherein said first and second limit positions lie in a control plane oriented substantially orthogonally to said tracking plane.

29. The combination of claim 28 wherein said control plane is proximate to and parallel with said primary pivotal axis.

* * * * *